Figure 1:
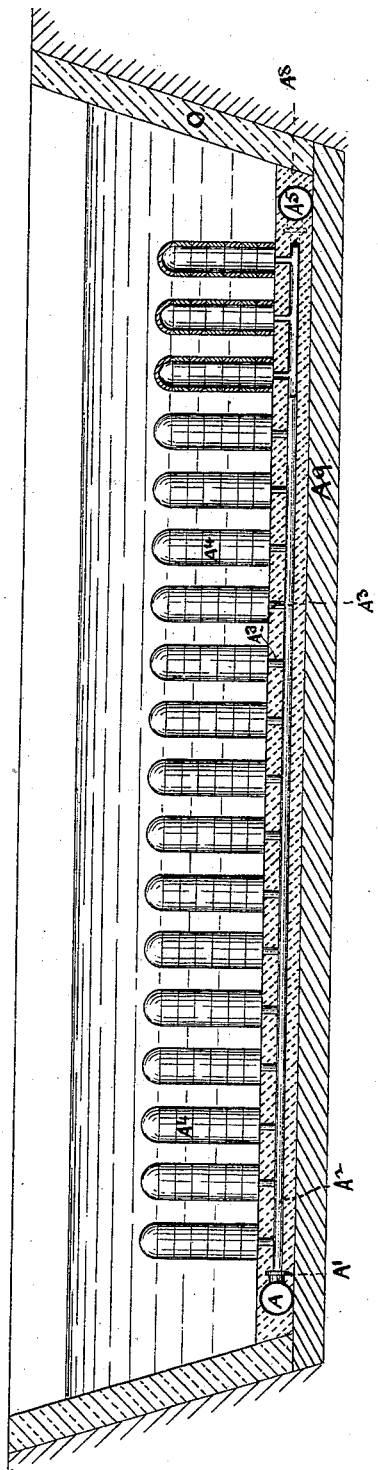

(No Model.)

2 Sheets—Sheet 1.

C. HOUGHTON.
APPARATUS FOR FILTERING WATER.

No. 272,881. Patented Feb. 27, 1883.

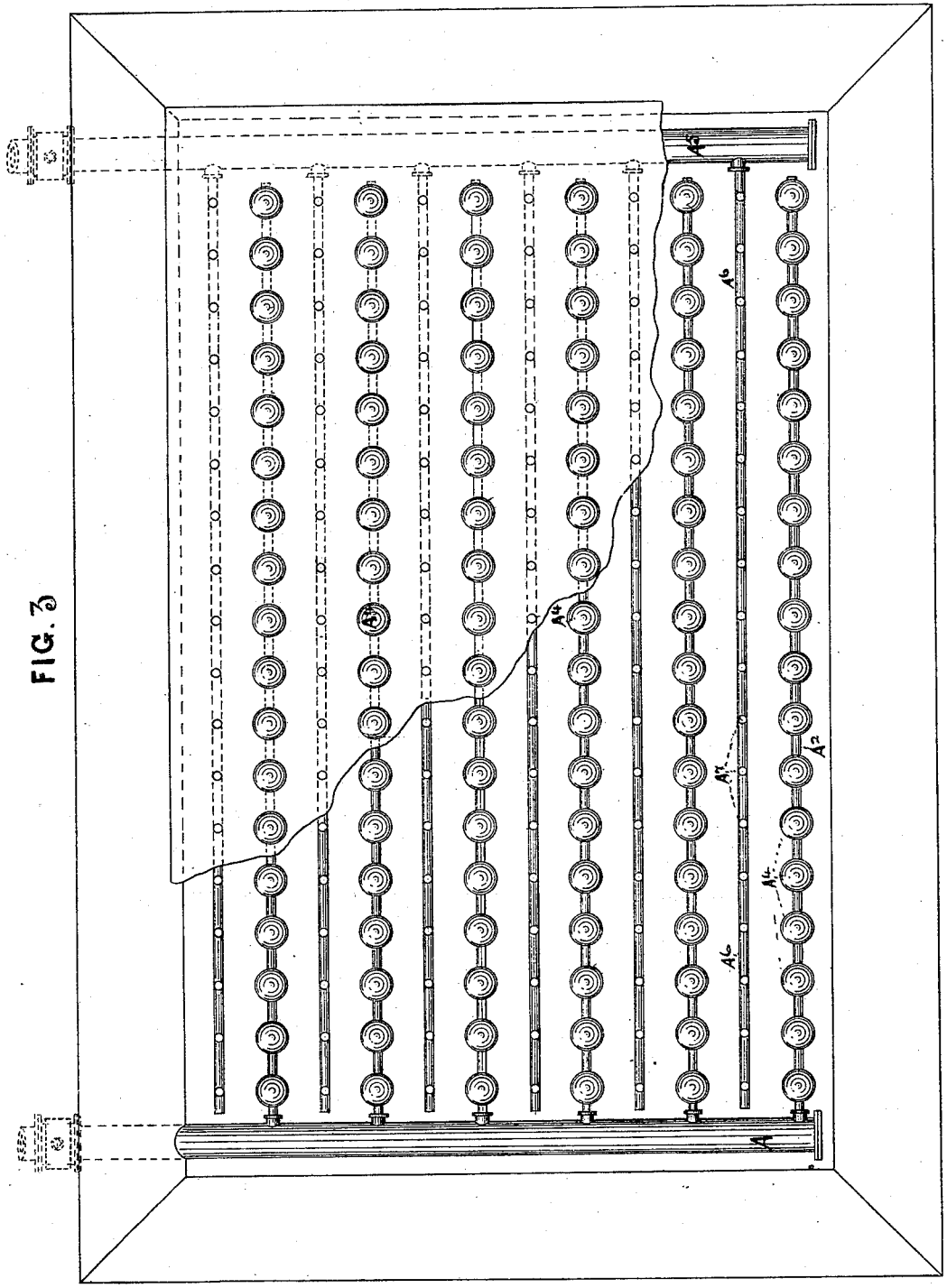

UNITED STATES PATENT OFFICE.

CHARLES HOUGHTON, OF BOSTON, MASSACHUSETTS.

APPARATUS FOR FILTERING WATER.

SPECIFICATION forming part of Letters Patent No. 272,881, dated February 27, 1883.

Application filed May 24, 1882. (No model.)

*To all whom it may concern:*

Be it known that I, CHARLES HOUGHTON, of Boston, in the county of Suffolk and Commonwealth of Massachusetts, have invented a new and useful Improvement in the Construction of Apparatus for Filtering Water, of which the following is a specification.

My invention relates to filtering water in large quantities, the object of it being to provide means of filtering the entire supply received through an aqueduct for a city or town or for other requirements in so perfect a manner as to eliminate all solid and semi-solid matter floating in the water; and it consists in the construction of the filtering devices as hereinafter described.

To put my invention in practice, a reservoir of sufficient area and depth to contain and filter the desired quantity of water is constructed upon a firm foundation extending under the entire space occupied. The inclosing walls of masonry or other construction will be supported by the foundation, and the upper surface of it will be made even and level, or nearly so. Across the breadth of the reservoir, on one side, a water-pipe of sufficient size, which I call the "main water-pipe," will be laid, extending through the walls of the reservoir, where it will connect with a pipe provided to carry the filtered water to the points of delivery. In this pipe, on the side of it toward the reservoir, there will be branch openings once in about three feet. From these branch openings, and connected with them, pipes resting on the foundation, which I will term "water-conducting pipes," will be extended in parallel lines horizontally and at right angles to the main water-pipe across the whole breadth of the reservoir. These pipes will be closed at the terminating end, and will have vertical branch openings once in about three feet, extending upward about three inches. On the side of the reservoir opposite the main water-pipe and parallel with it there will be laid another pipe which I call the "main mud-pipe," extending across the whole breadth of the reservoir and through the outer wall, where it will be fitted with a suitable stop-cock, which will be kept closed while water is being filtered, and will be opened when necessary to wash the sediment out of the bottom of the reservoir. This main mud-pipe will have a series of branch openings from it on the side, like those already described in the main water-pipe. From these branch openings and connected with them horizontal pipes, which I will term "mud-pipes," resting on the foundation and having vertical branch openings once in about two feet, will be laid in parallel lines—one between each of the water-conducting pipes, extending across the reservoir nearly to the main water-pipe. When all these pipes are laid down and fitted in place the space around and between them will be filled with concrete to a level of about three inches above the top line of the pipes. When the concrete has become hardened a closed chamber made of a porous substance that will admit the percolation of water through it will be built over each vertical branch opening from the horizontal pipes leading to the pipe for filtered water or main water-pipe, preferably in the form of a cylinder closed at the top end with a semi-globular cap. The height of these chambers will be regulated by the depth of the reservoir, and the breadth or diameter will generally be about eighteen to twenty-four inches. I make these chambers of very soft burned brick, which can be made in rings or parts of rings about one and one-half to two inches thick, and laid up with cement in the joints, so that no water can pass between them, or bricks soft-burned in ordinary form may be laid up edgewise with cemented joints.

The invention is not confined to the use of brick, as any other suitable porous substance may be used for the walls of the chambers, and any other form may be used instead of a cylinder. So far as known, a very soft burned brick is the best filtering substance of which the chambers can be constructed, as no solid matter will go into it or adhere to the outside of it to impede the passage of water. As water will percolate slowly through the walls of each chamber, a sufficient number of them must be provided to filter the quantity required.

Figure 2:
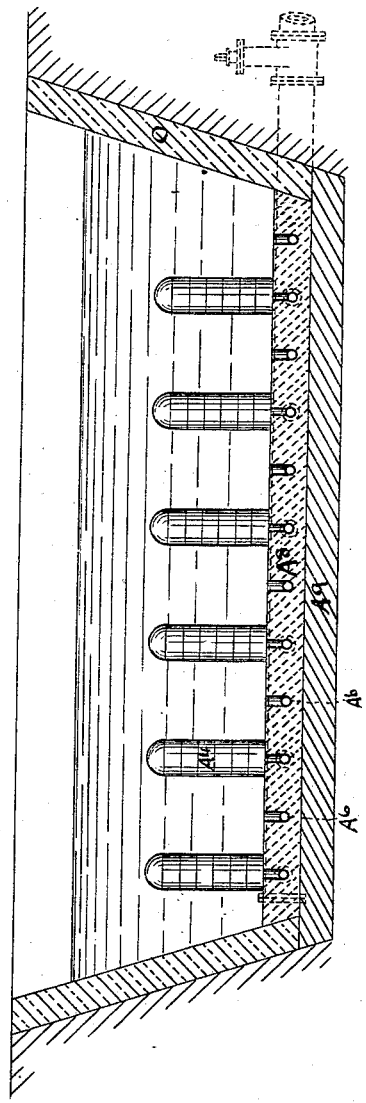

In the drawings annexed, Figure 1 shows a section through one of the horizontal pipes laid in concrete and a row of the perpendicular branches and closed filtering-chambers over them, and also the ends of the cross-pipes into which the horizontal pipes enter, and the walls and bottom of the reservoir. Fig. 2 shows a cross-section through the reservoir and horizontal pipes and filtering chambers and walls. Fig. 3 shows a plan of the reservoir and filtering-chambers.

A is the main pipe, carrying filtered water into the delivery-pipe outside the walls of the reservoir; A', branch openings on the side of main water-pipe A; $A^2$, horizontal conducting-pipes, carrying water into main water-pipe A; $A^3$, vertical branch openings in pipes $A^2$; $A^4$, filtering-chambers over the vertical branch openings $A^3$; $A^5$, main mud-pipe; $A^6$, branch mud-pipes; $A^7$, vertical branch openings in the branch mud-pipes; $A^8$, layer of concrete, in which horizontal pipes $A^2$ and $A^6$ are embedded; $A^9$, foundation; O, walls of reservoir. When the reservoir, in which these chambers and conducting-pipes from them are placed, is filled with water, and the main mud-pipe closed, a constant percolation through the porous walls of the chambers takes place, which flows into and through the conducting-pipes underneath.

It is obvious that the filtering capacity may be increased by increasing the depth of the reservoir and the height of the filtering-chambers, and it may be increased to an unlimited extent by increasing the area of the reservoir and the number of chambers in it. When sediment collects in the bottom of the reservoir, by opening the stop in the main mud-pipe outside the wall there will be a rush of water through all the vertical branch openings in the mud pipes, which will carry away the sediment and leave the outside of the filtering-chambers and the bottom of the reservoir clean—viz., as the filtering-chambers are closed, so that nothing can pass to the inside of them except a fluid percolating through the porous walls, and as they will at all times be wholly submerged, so that no air can come to the surface of them, it is clear that when the filtered water flows from the inside of the chambers to the conducting-pipes there will be a tendency to a vacuum in the chamber, by which the pressure of the atmosphere will act to force water through the porous walls of the filtering-chambers, in addition to the gravity of the water, which would be the only force to drive the water through the walls if the chambers were not closed. Thus a much greater filtering capacity is obtained by the use of closed chambers than could be if the chambers were open to the effect of the atmosphere on the inside.

I am aware that the passing of water through porous walls to eliminate extraneous matter from it is not new, and I do not broadly claim that; but What I do claim as new and my invention is—

1. The above-described improved device for filtering water, consisting of a water basin or reservoir having in the bottom a system of conducting-pipes, $A^2$, with vertical branches $A^3$, and closed filtering-chambers with porous walls $A^4$, all substantially as set forth.

2. In combination with a water basin or reservoir provided with filtering devices, as described, the mud-pipes $A^5$, $A^6$, and $A^7$, all substantially as described, for the purpose specified.

3. In combination, in a filtering device, a water-reservoir having a suitable induction-pipe, submerged closed chambers having porous walls and conducting-pipes from the bottom, and eduction-pipes from the bottom of the water-reservoir, all substantially as set forth.

CHS. HOUGHTON.

Witnesses:
N. H. SPENCER,
E. A. PHELPS.